Aug. 12, 1969   L. P. VITT ET AL   3,461,280
AUTOMATIC MICROSCOPIC ELECTRONIC DATA ACCUMULATOR
Filed Sept. 23, 1965   12 Sheets-Sheet 2

INVENTORS
LEONARD E. VITT &
ROBERT M. KENDIG

BY CAROTHERS & CAROTHERS

THEIR ATTORNEYS

INVENTORS
LEONARD E. VITT &
ROBERT M. KENDIG
BY
CAROTHERS & CAROTHERS
THEIR ATTORNEYS

INVENTORS
LEONARD E. VITT &
ROBERT M. KENDIG
BY

CAROTHERS & CAROTHERS
THEIR ATTORNEYS

United States Patent Office 3,461,280
Patented Aug. 12, 1969

3,461,280
AUTOMATIC MICROSCOPIC ELECTRONIC DATA ACCUMULATOR
Leonard P. Vitt, Irwin, and Robert M. Kendig, Trafford, Pa., assignors to Femco, Inc., Irwin, Pa., a corporation of Pennsylvania
Filed Sept. 23, 1965, Ser. No. 489,553
Int. Cl. G06f 7/38; G06g 7/12
U.S. Cl. 235—92    8 Claims

ABSTRACT OF THE DISCLOSURE

The automatic microscopic electronic data accumulator of this disclosure reads a time controlled optical signal through a microscope scanning a subject to obtain a reading of the character of the subject. This light variant signal is simultaneously converted to a comparative voltage level signal of computer magnitude which with a timing pulse rate of predetermined frequency is subjected to detecting point counters for predetermined signal voltage levels through binary logic units in the circuit.

The binary logic units are progressively biased to operate specific classifying units corresponding to the predetermined voltage levels of the signal to distinguish the different characters and combinations produced by the optical signal relevant to time.

The classifying units registering time counts on gate pulse counter units through their corresponding gate pulse units at their predetermined signal levels and time periods indicated in the original optical and corresponding voltage level signals. Thus the registered time counts on the gate pulse counter units actually measure size as well as number that appeared in the original optical signal when scanning the subject. This scanning and measuring of size as well as number of the characteristics of the subject is substantially simultaneous with the tacking of the optical signal, being within a part of a microsecond.

Each binary output is connected to the next lower gate pulse unit as a counting inhibitor level of the latter.

---

This invention relates generally to the method and apparatus of converting optical information from a microscope into an electrical signal and more particularly to an automatic electronic data accumulator of microscopic information from the electrical signal and to dissimulate the same.

The present problem of manually viewing, recording, digesting, classifying and interpreting the quantitative as well as the qualitative analysis of microscopic information takes a very long time. The present method machine reduces this time from months to minutes. This is highly important not only for quick classification of fuels, ores and metals but also for the medical profession for quickly checking the presence in numbers of a cancerous cell to foresee the rapidity of their growth and the rate of destruction of the healthy cells. It shortens biopsy study to minutes. Once the specimen is placed in the lighted field of a microscope by scanning or by traversing the microscope field, the amount of transmitted or reflected light is placed by the microscope lens system on the photo multiplier tube which converts the magnified subject into an electrical current that is then amplified in a high-gain, low-drift, wide-band direct current amplifier. This signal is then subjected to a bank of level detectors or level discriminators which are initiated by different voltage levels of the signal. The signal of each of these distinguished levels then passes through NAND and a level gating circuit supplied with a pulse rate of constant frequency by a clock multi-vibrator, the resulting signal being supplied to a pulse stretcher of the delay multi-vibrator type. This signal is recorded on a point counter for each level and a total counter.

The same impulses are fed through a gate pulse generator to binary counters with memory flip flops, thence readout gates and size tally counters.

These microscopic readings may be further extended quantitatively by using coloring dyes by those specimens that distinguish themselves by absorbing dyes. The analysis is augmented by using color wave-length filters on the field alone or in combination with noncolored light and colored dyes. Some specimens need no dyes and respond to monochromatic light of different frequencies. Thus, the combination of different wave-length filters can be made to cancel out, or render invisible, certain parts or entities in the field being studied and make apparent those entities which react to the frequency of the different colors as controlled by the monochromatic light source. Thus, quantitative and qualitative analysis may be made possible by these combinations. It is sometimes possible to complete some analyses with one pass or sweep over the specimen, which materially shortens the sweep and analysis to micro-second computation of at least one quarter of a cycle, .004 second or 4 milliseconds. With improved lighting conditions wherein the natural coloring of the specimen can be magnified by the light refraction or by transparency, when the specimen is thin, scanning time may be increased in speed. This in turn decreases the time of taking an electro-specimen analysis.

The lighting of the specimen may be totally from behind the specimen (transmitted light) or totally on the viewing side of the specimen (reflected light) or a combination of both. When monochromatic light is used only certain transmitted light, color sensitive entities will produce an image on the photo multiplier tube that will be transformed into a signal that is pulsated, read, differentiated and classified in a very short period of time. The process requires the transformation of the information image by the photo multiplier into a varying current level electrical signal, the levels of which are indicative of the information readout and which levels classify the information to be compiled automatically to complete the same. This information signal is amplified and changed from a varying current level signal to a comparative voltage level signal of computer circuit operating magnitude. This voltage is supplied to a point counting voltage level detections logic circuit including a bank of bistable level detector units or level discriminators. A biasing voltage is supplied to each successive bistable unit to classify said unit for operation at different predetermined voltage level. The voltage of each level selected by this biasing voltage control determines the voltage level accepted for that level, and all voltage levels greater than the last selected level will be accepted by the latter as signals for pulse counts.

A NAND inverter unit is provided for each level detector to provide a negative six volt signal. A multi-vibrator pulse rate clock of constant frequency such as one kilocycle per second is used to feed a gate pulse unit for each voltage level of the bank along with the signal from the respective NAND inverter to produce a pulse signal in each level. This signal is then fed to a pulse stretcher unit for each gate pulse unit, which in turn provides a pulse for each electrical pulse counter in each level and one for the total. In order to insure the bistable level output signals remain on their selected levels; each bistable output is connected to its next lower level gate pulse unit as an inhibitor level of the latter. The Automated Microscope Electronic Data Accumulator comprising this invention is actually a discriminator unit for measuring the optical properties of a specimen through automated digital means. Thus, any of the physiological or optical properties of the specimen may be determined through the level of reflectance, transmission, or differential light absorption due to various degrees of intensity of light or pretreated light, such as monochromatic, phase, dark field, polarized, etc., directed into the field of an ocular system such as a microscope. Once the various degrees of intensity of different levels of reflectances are determined, the electronic accumulator comprising this invention may be programmed to receive electrical signals which are indicative of physiological characteristics making up the specimen being examined. Thus, the accumulator system is equipped to read, measure, program and discriminate into various levels the optical properties of the specimen in terms of analogue signals which are converted into digital pulses which are recorded on preselected readout counters.

Other objects and advantages appear hereinafter in the following description and claims.

The accompanying drawings show for the purpose of exemplification, without limting the invention or claims thereto, certain practical embodiments illustrating the principles of this invention wherein:

Figure 1:
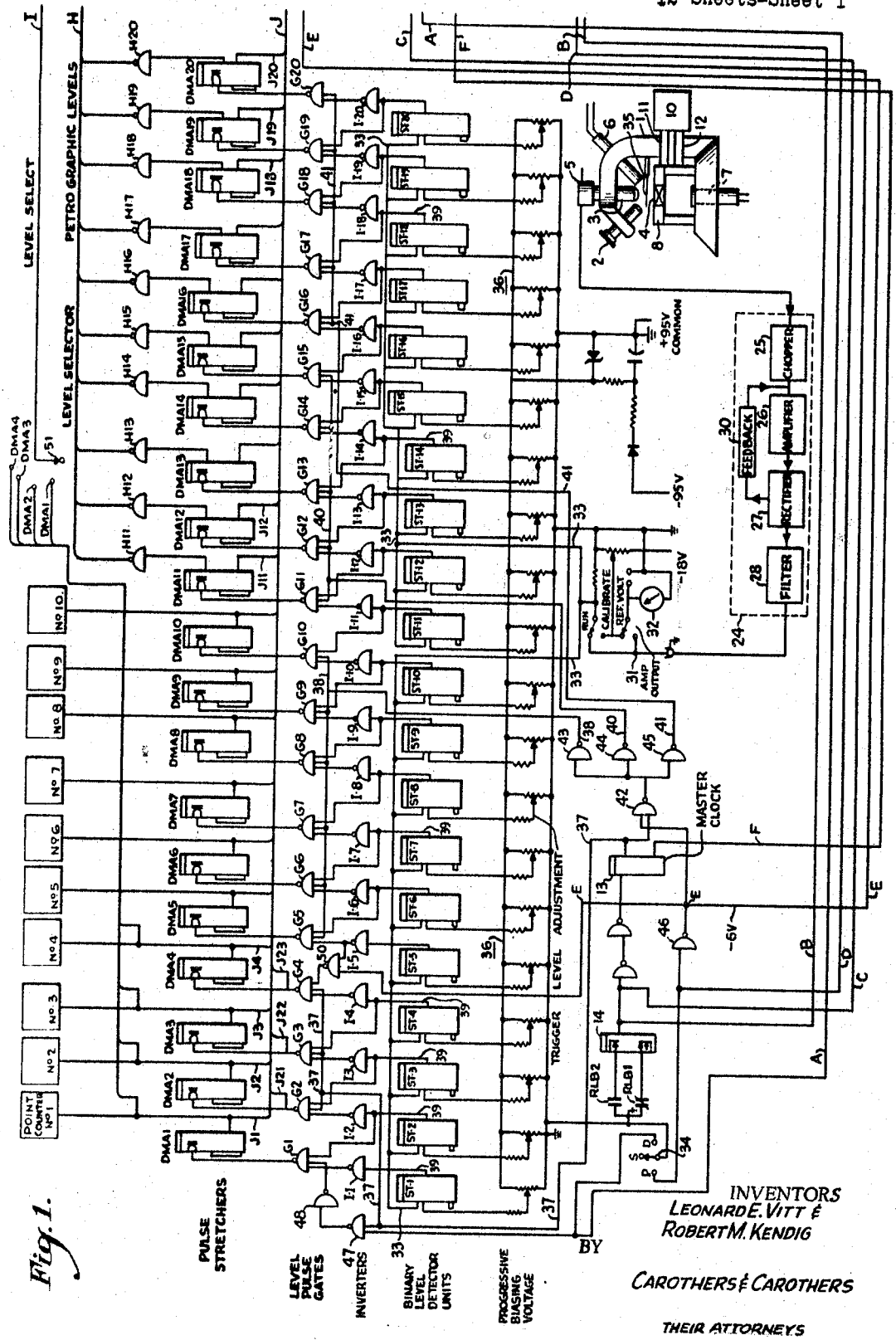
FIG. 1 is a diagrammatic circuit of a microscopic electronic data accumulator showing the logic diagram, the level detection, the point counting and mode selection.
Figure 12:
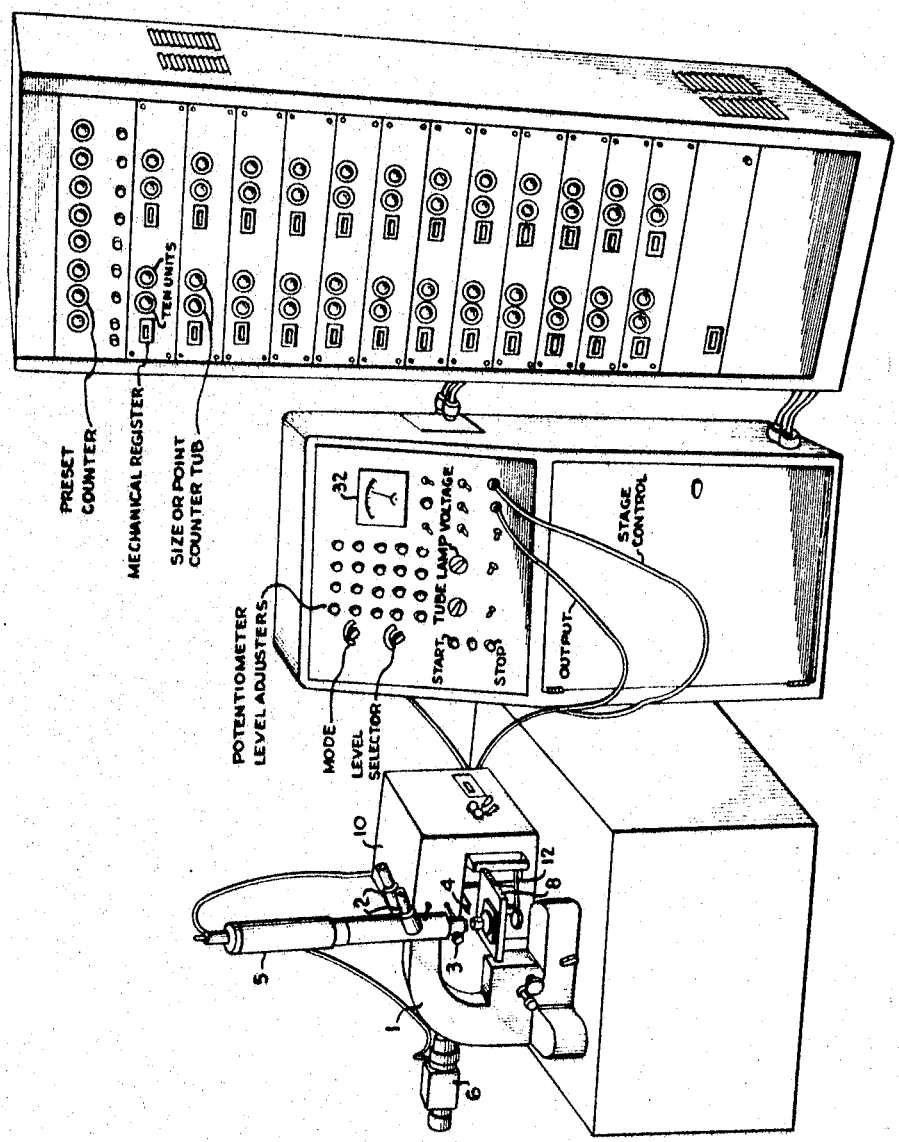
FIG. 12 is a perspective view of the completed apparatus comprising this invention.

With reference principally to FIGS. 1 and 12, the microscope 1 is provided with a magnifying eyepiece 2 magnifying specimen piece 3 which collects light signals from the specimen indicated at 4 and passes them to the photo multiplier tube 5.

The light source on the specimen may be obtained in one of two ways. The source of light 6 is secured to the microscope and is adjustably maintained to focus light on the surface of the specimen 4 for the purpose of providing a reflected light signal to the photo multiplier tube.

If the specimen 4 is of the character that it is transparent, the light source shown at 7 is provided to pass the light rays upwardly through the specimen 4 and thus be arranged in the form of a signal due to the differential value of the passing through the specimen picking up the characteristics being searched that are contained within the specimen 4.

Figure 3:
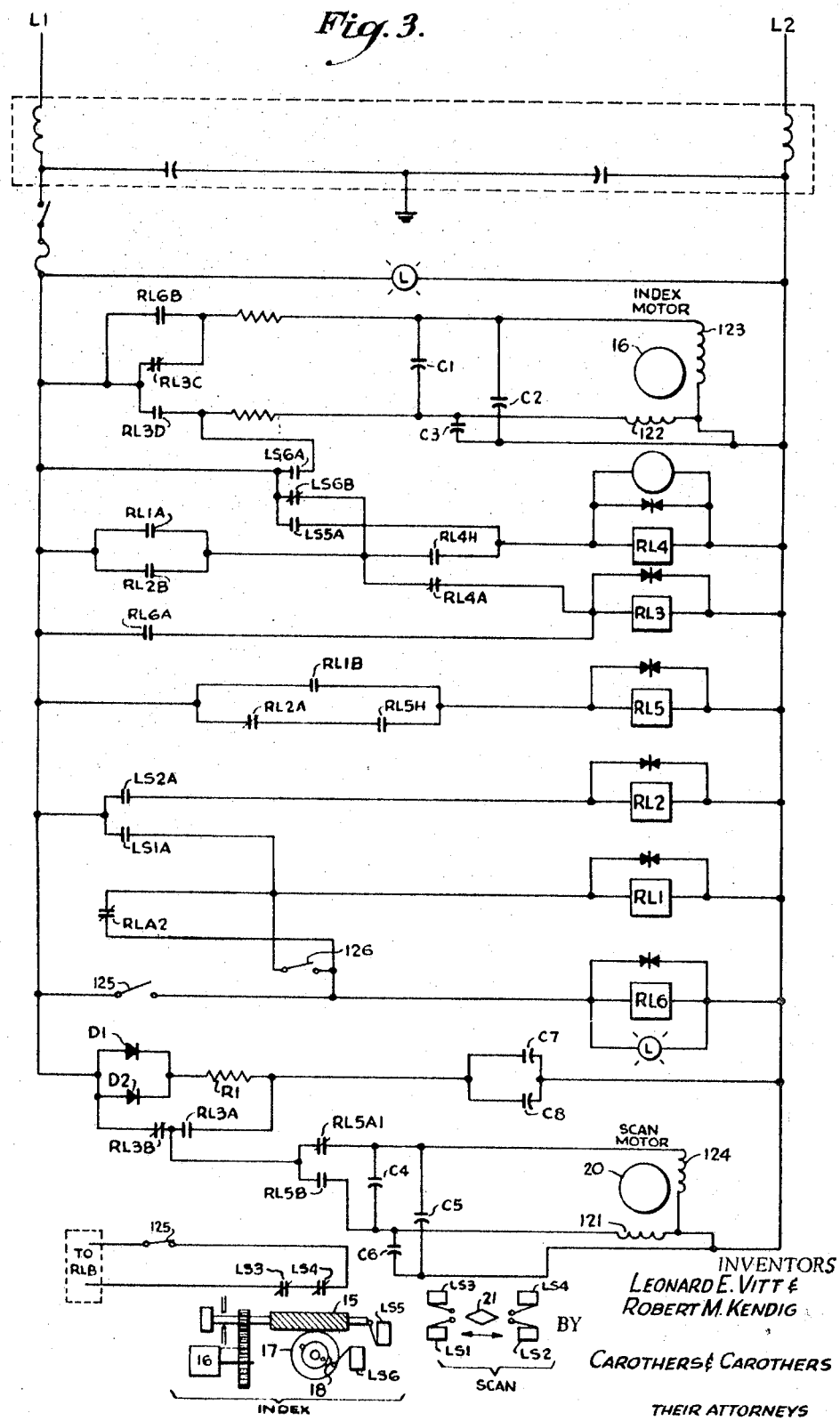
FIG. 3 is a schematic diagram of the microscopic stage drive.
Figure 13:
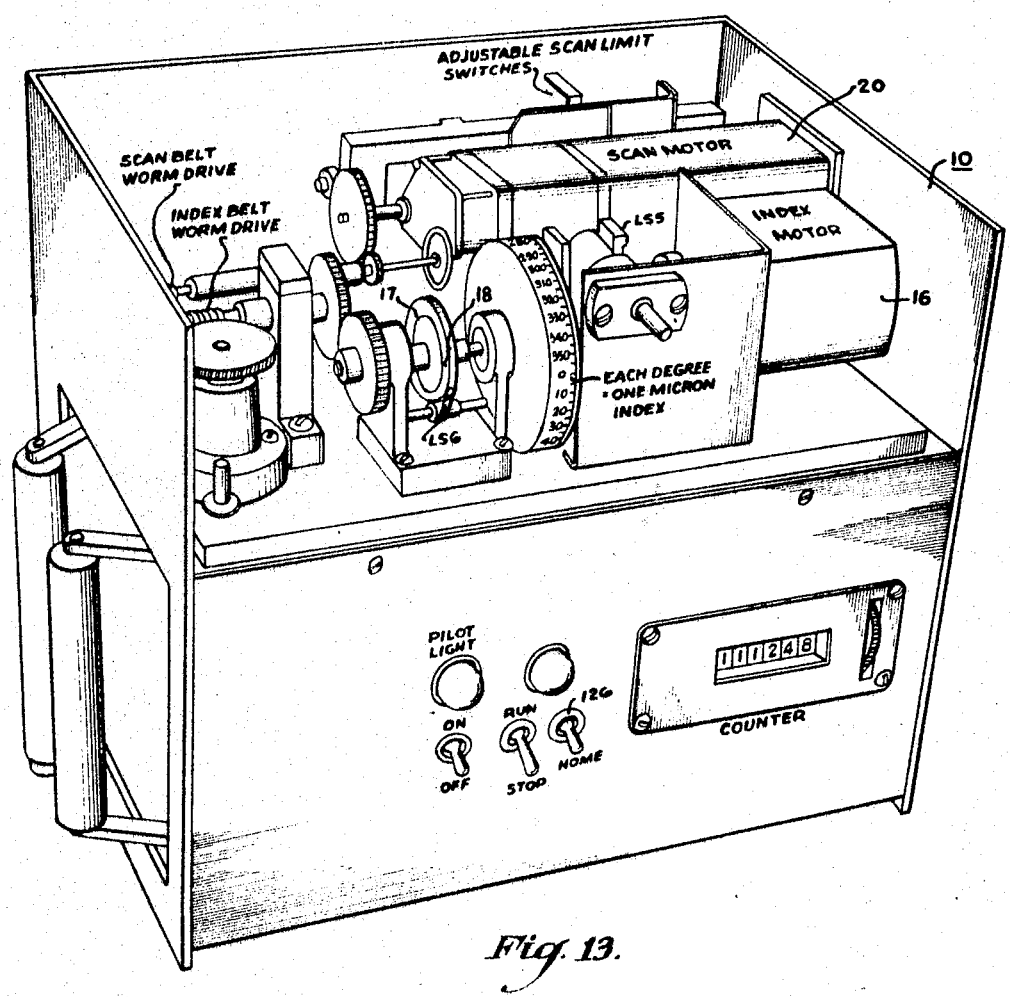
FIG. 13 is a perspective view of the stage drive comprising this invention.

The specimen 4 is mounted on a stage 8 driven by the stage drive 10, shown in FIGS. 3, 12 and 13, which is provided with the two sets of drive belts 11 and 12 for the purpose of moving the specimen 4 in progressive scanning paths obtained through the drive of the belt 11 and the belt 12 for traversing the scanning position in increments along the other dimension at right angles to the scanning paths. In practice the scanning is preferably adjusted to move the specimen across the field of the microscopes 2 and 3 at the rate of one millimeter per second. This, however, may be changed to a number of faster speeds as well as slower speeds to comply in coordinate cooperation with the operation of the system and particularly that of the MV-30 of pages 3-157 to 3-161 in the "Computer Control Manual" multi-vibrator master clock 13 which, when set to pulse at a rate of 1 kilocycle per second, will permit direct readings on the counters in microns, thus providing an instrument for accurately measuring the distances or the distance across the crystal or any other object being classified in microns. Thus by different combinations of operating the stage drive 10 to move the specimen at different speeds, the same may be correlated with the multi-vibrator master clock 13 to produce other readings in combination with the multi-vibrator master clock to provide direct readings from counters. This same feature of this invention may be translated into percentages by the use of a preset counter which starts and stops the reading through a period of a predetermined number of reading pulses. Thus the counts on the individual counters for different characteristics of the specimen can be related to the count on the preset counter to provide direct percentage relationships between the various components representing various characteristics of the specimen being observed.

As shown in FIGS. 1 and 3, to actuate the stage drive 10, one pair of adjustable scan limit switches LS1 and LS2 are employed to control the beginning and end of the scanning stroke across the specimen. Another pair of adjustable scan limit switches LS3 and LS4 set to perform the same duties, are arranged to operate a control relay RLB that functions through the contacts RLB1 and RLB2 to turn on and off the multi-vibrator master clock 13 through a flip flop 14, an FF20 of page 3-97 to page 3-103 of the "Computer Control Manual," to avoid contact bounce introducing false pulses into the multi-vibrator master clock. LS3 and LS4 contacts are set to function before their corresponding contacts LS1 and LS2 to insure the stopping of the clock 13 and to allow the stage drive 10 to move the specimen slightly beyond the position of stopping the clock before the stage drive 10 indexes the stage to move the same to the next consecutive line of scanning and reverses the drive in the opposite direction and start the scanning motion before the contacts LS3, LS4 are again actuated to start the clock 13 through the flip flop 14 and resume the scanning of the specimen.

As further shown in FIGS. 3, 12 and 13, a worm 15 which is driven by an index motor 16 for the purpose of driving the adjustable worm gear 17 which is provided with an adjustable cam 18 to operate the limit switch LS6 in driving the worm 15. The worm shaft 15 is mounted so as to permit a limited axial motion, which axial motion is employed to actuate the limit switch LS5 causing the scan motor 20 to reverse and to start in the opposite direction. The index motor also reverses and starts in the opposite direction; when it is stopped by the limit switch LS6, it is ready for the next index cycle. The index section is driven through the stage drive 10 by the belt 12 and is provided with a gear train to operate the same.

The index motor 16 consists of a single gear-head reversible motor with dynamic braking and is connected to operate each time the scan cam 21 reaches the limit switch LS1 or LS2 at either end of its travel.

The index has an adjustable ratchet action that allows the motor 16 to rotate the output shaft when turning counter-clockwise and holds the shaft from turning when the motor is turning clockwise. The index is adjustable through a knob indicated at the end of the worm 15. The rotating of this knob turns the worm 15 which in turn drives the worm wheel 17 as connected through an adjustable bushing to the graduated drum dial carrying the cam 18.

Figure 4:
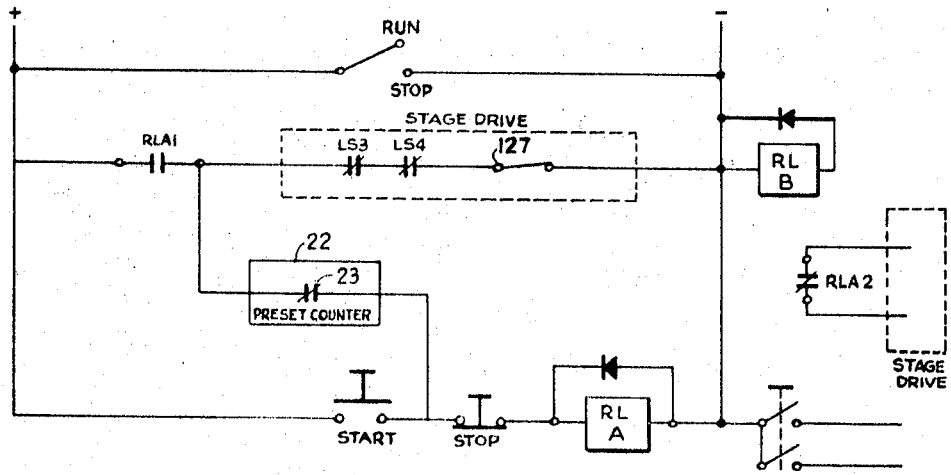
FIG. 4 is a schematic diagram of the stop and start of the microscopic electronic data accumulator.

A preset counter 22 as shown in FIG. 4 is an electronic device including a series of eight or more cold cathode counting tubes—each one of which is manually adjustable by a knob which, when preset, will function to actuate a relay when the preset count is reached. This relay is indicated by the normally closed contact 23 in FIG. 4.

Referring again to FIG. 1, the output of the photo multiplier amplifier tube 5 in the form of a current signal which is an electrical analog representation of the sample specimen passing under the microscope. This tube 5 is connected to an amplifier 24 which includes the chopper 25 that chops the signal at a constant rate, for example, 1000 pulses per second thus converting the analog signal to a digital signal. The pulses are then amplified by the AC amplifier 26 to a level where they can operate into a pulse height discriminator or trigger circuit. A pulse equal to or greater than this value will cause a momentary output. This signal is then amplified by the rectifier 27 and passes through the filter 28, there being a feed-back network 30 connecting the amplifier with the output of the chopper 25. Thus the signal from the photo multiplier 5 and the amplifier 24 is supplied to the circuit at 31 which through the appropriate switches connects the incoming signal to the logic in the run position. The volt meter 32 is connected to an appropriate switch for reading the reference voltage or the amplifier output voltage from the amplifier 24. The output voltage from the amplifier 24 is a voltage of varying amplitude which in any instance is representative of the portion of the specimen being scanned. The varying light intensity received by the microscope 3 is converted by the photomultiplier tube into a varying current signal which varying current signal is received by the chopper 25 and thus converted by this amplifier 24 into a voltage signal of varying amplitude. The leads, of course, from the photomultiplier 5 to the amplifier 24 and to the system, are shielded to prevent extraneous pickup that would in any way interfere with the signal. This, of course, is required to be carried through the circuit until at least the triggering stage.

As shown, the incoming signal from the line 31 after passing through the switch in the run position continues through the line 33, which is a bus that is split and operates in both directions to feed in parallel twenty Schmitt triggers which serve as voltage amplitude discriminators to perform a function of leveling detectors known as the Schmitt trigger PAC, ST–30 and shown in "Computer Control Manual" page 3–221 to 3–229.

The flip flop 14, that controls the master clock 13, is in fact a basic flip flop, shown in the manual on page 3–97, PAC FF–20, and the clock 13 is a multi-vibrator clock PAC–MV–30 shown on page 3–157 to 3–161.

The particular circuit shown herein is provided with a mode control switch 34 which has three positions: one indicated as the D position, the next as the S position, and the third as the P position.

The mode switch 34 and this present microscopic electronic data accumulator has been arranged for the specific use of measuring and counting granulated specimens of coal mounted in plastic matrix to form a sample. The study of the coal by this invention is to determine the presence of impurities and the presence of pyrite in the sample and as a measure of the pyrite content in the coal sample. This result is determined by measuring the pyrite as a free pyrite, the pyrite on the surface of the coal as well as the pyrite encased in coal and provides an exhaustive analysis of the coal. This result, taken together with the size of the particles of the pyrite in the coal in the states of being free, or on the surface or encased in the coal provide a variety of combinations of empirical data that enable one to prognosticate the problems to be expected in the different uses of particular coal.

For this phase of the analysis, the problem is to determine the relative proportion of pyrite to coal in the sample. It is known that the coal has a reflectance value between 0.3% and 10%, while the pyrite has a reflectance value of greater than 10%. The solution is to count the number of pulses which operate only the "10% or less" discriminator and categorize this as a measure of the coal. Also count the pulses which operate both discriminators and categorize these as measure of the pyrite. Another counter will record the total number of pulses. For this analysis, the pulses which represent the plastic potting compound will be blocked out, as they are represented by a reflectance of less than 0.3%.

The pulses which are greater than 0.3% are fed to the discriminators and also to a delay circuit and pulse shaper. The purpose of the delay is to give the discriminators time to respond and to set up the proper category gate. When the delay period is over, a pulse is produced on the "Count Line" and is registered on both the TOTAL COUNTER and whichever counter has its gate enabled by the discriminators.

Thus the mode switch 34 is provided with three phases of investigation. The first is indicated as D, which represents the distribution of the pyrite as just described and also permits size counting of one level when obtaining the distribution of the pyrite. The scanning, of course, may be repeated to recount the distribution and size count different levels or materials to obtain a complete graphic picture of the analysis.

The position S is known as the operating position for obtaining percentage relationship between four levels of reflectance or materials in the specimen being observed and simultaneous size distribution analysis of any one level or material during the percentage analysis. This function can be repeated to obtain size distribution analysis of any different level or material of the same specimen.

The position P of the mode switch 34 is the third position, one for a complete petrographic analysis which provides for obtaining percentage relationships of twenty different levels or materials in the sample being analyzed. This mode switch, of course, may be employed or otherwise expanded and redirected for measuring other characteristics, particularly when the specimen changes. For example, this invention may be employed in counting the number of cells together with their size in a cancer biopsy wherein the cells may be distinguished without color or may be dyed to make them more responsive to the reflected or transmitted light employed with or without a wave length filter to aid in the reading and screening of the different formations found in a specimen containing the cells. The use of coal analyses in combination with pyrite is merely illustrative of this invention and it does not limit the same to such analyses. Thus as shown in FIG. 1 filters such as illustrated at 35 can be employed for this purpose.

Each one of the ST1 through 20 of the Schmitt trigger level detectors are of the character shown in the "Computer Control Manual" pages 3–221 to 3–229, and are supplied by a reference voltage from their independent potentiometer trigger level adjustments for the operation of the specific trigger level detector, which reference voltages would be progressively increased from ST1 through ST20 from the reference voltage supply bank indicated at 36.

When the signal, which is constantly supplied to the bank in parallel, reaches or matches the level determined by the pre-setting of the reference voltage, the particular trigger level detector will fire or change the state of its output voltage level. This change is in the nature of a step function and has, from here on, in the circuit no relation to magnitude of the incoming signal that initiated the same. Thus each trigger level detector ST1–20 must supply its step function output 39.

The step function output of the series of Schmitt trigger level detectors is cross interlocked in the output sampling gates G1 through G20 in such a way that only one output sampling gate at a time can be enabled by a pulse from the multi-vibrator master clock 13. The trigger level detectors ST1 through ST20 must have proper phase to actuate the output sampling gates. However, when they are not so provided with the proper phase, an inverter is interposed between the output and the output sampling gates to place the multiple inputs in phase so that the energized gate is properly activated to send a pulse for the purpose of activating the corresponding pulse shaper or stretcher, the output of which in turn is a pulse for the purpose of driving the point counter as indicated. The output sampling gates are indicated as G1 to G20 inclusive and their corresponding inverters are indicated as I1 through I20. Each of these output sampling gates and inverters are a digital module NAND DL20 of the character shown in the "Computer Control Manual," page 3–50A and 3–50E, which will be found to be the same source for other units of this disclosure. It will be noted that in almost every instance the interlocking is obtained by connecting the output signal of each ST to the next lower output sampling gate G1 to G20. Whereas the output to the corresponding inverter is connected directly to the corresponding output sampling gate G1 to G20. The other or third input for the sampling gates is provided from the proper phase of the clock 13 as indicated by the bus lines 37 for the gates G1, G2, G3 and G4, and the bus 38 for the gates G5 to G10; and the bus 40 for the gates G11 to G15; and the last bus 41 for the gates G16 to G20 inclusive. Referring specifically to the clock 13, it will be noted that the bus 37, representing the output from the multi-vibrator master clock, also feeds the DI20 inverter 42 which inverts the pulse to supply the bank of DI20 inverters 43, 44 and 45. The purpose of these inverters is to distribute the load. If the original clock pulse and the bus 37 are capable of supplying the full load, these inverters 42 through 45 would not be necessary. Again, the inverter 42 functions only when provided with a proper phase input from the inverter 46 which is also a DL20 which in turn has its input connected directly to the contact P of the mode switch 34 which is also to the line D which line is connected to the circuit in FIG. 2. The output of inverter 46 is connected to line E.

The mode contact D is connected directly to the line A which in turn forms an input of proper phase relation in conjunction with the bus 37 to the inverter 47 which is a DL20, and the output of which feeds the inverter 48, which also is a DL20, and supplies in proper phase the pulse required to actuate the sampling gate G1.

Owing to the splitting of the digital modules DM20A, shown in pages 3–51 to 3–66 in the Manual, which are numbered 1 to 20, the DMA2, DMA3 and DMA4 pulse-stretchers are employed as an independent group; in order to produce the interlock from ST5 to the sampling gate G4, a DI20 in the form of the inverter 50 is employed and connected to the output of the inverter 15 and is also provided with a connection to the line E which is connected to the output of the inverter 46 and which also gates the inverter 42. Thus the output of the inverter 45 and the output of the inverter 46 must be in phase in order to cause a pulse to be gated through the inverter 50 to the input of the gate G4.

POINT COUNTERS

The pulse-shaper or pulse-stretcher digital module PAC DM20A, shown in pages 3–57 and 3–65 of the "Computer Control Manual," are numbered on the drawing DMA1 to DMA20. Each receives its input pulse from the corresponding sampling gates G1 to G20; they in turn produce an output impulse, the first ten of which directly supply a pulse to operate the point counters 1 through 10. Each of the point counters consist of two cold cathode counting tubes, one for the units digit, one for the tens digit, followed by a six digit mechanical register capable of storing and reading out a count up to a billion as shown in FIG. 12.

Figure 2:
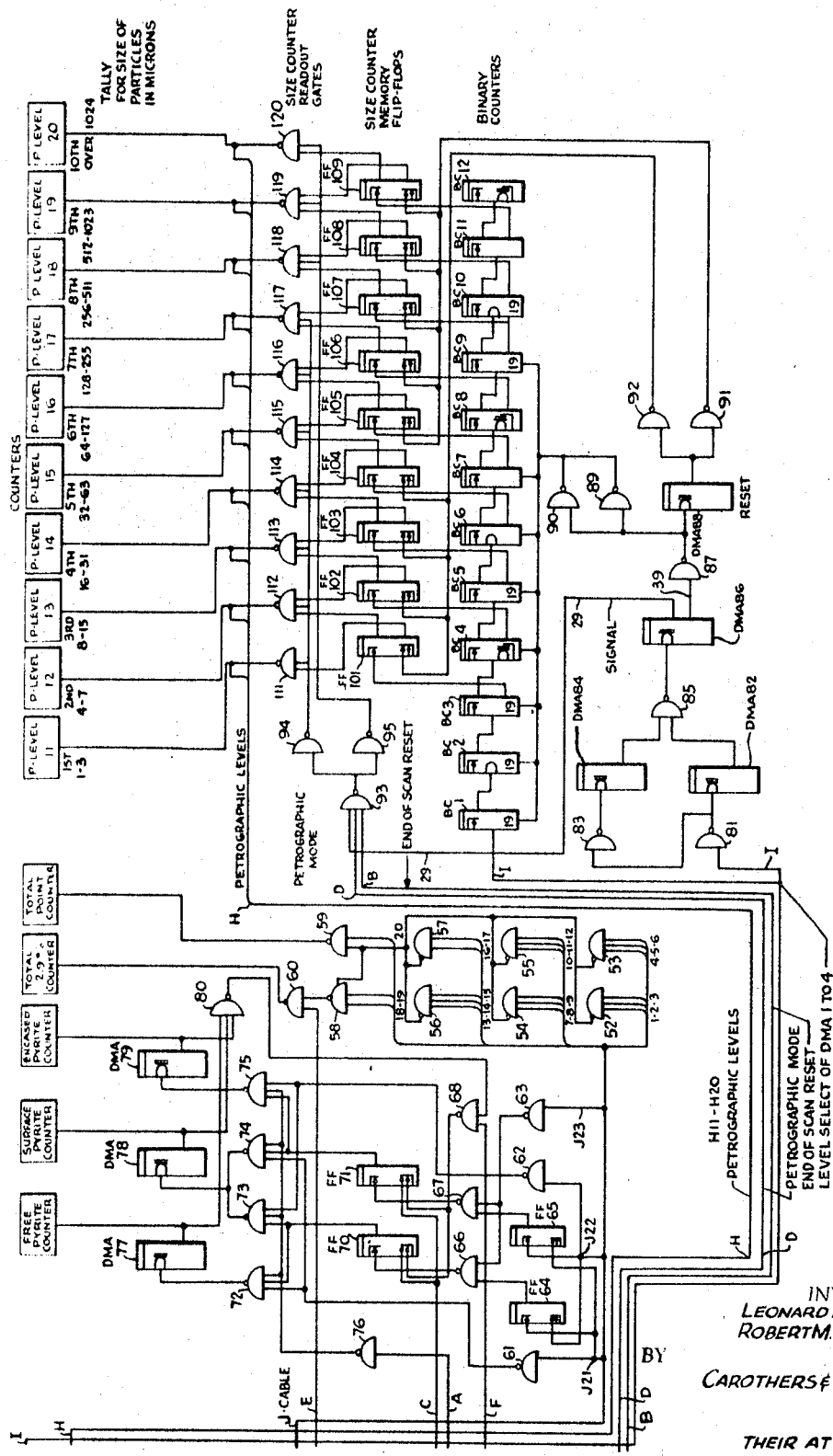
FIG. 2 is a continuation of the diagrammatic circuit of the microscopic electronic data accumulator of FIG. 1 including the logic diagram, pyrite distribution, total counters and size counting diagram.

The output pulses from the DMA1 to DMA20 are also independently supplied through the cable J for use on the pyrite distribution logic circuit in FIG. 2.

Figure 10:
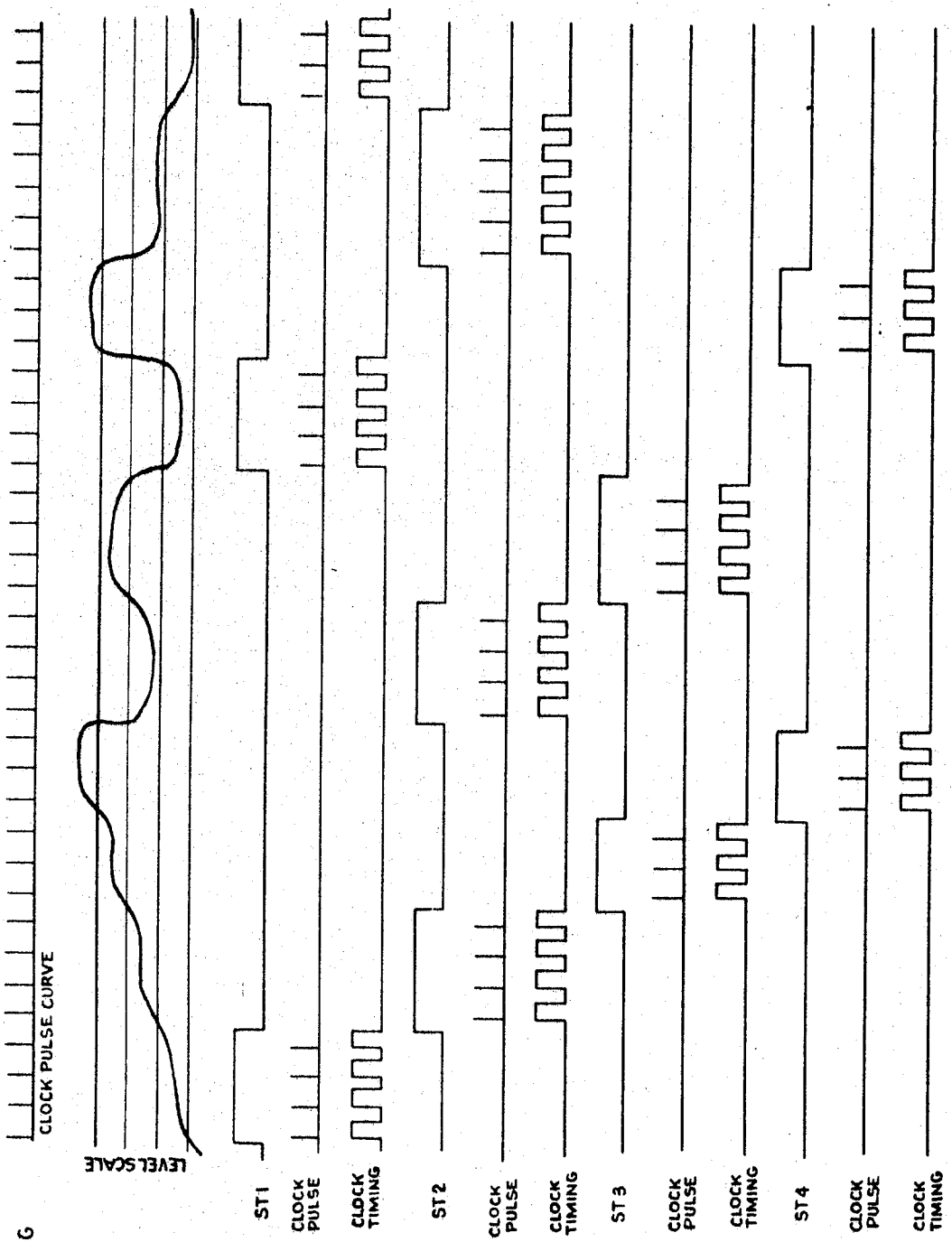
FIG. 10 is a point counting timing chart.

The output circuits from the DMA1 through DMA4 or any multiple thereof are also supplied with a selector switch indicated at 51, which selector switch is connected to the output of DMA1 through DMA4 which carries the same through the line I to the counter tally for counting the number of particles which fall in the size ranges listed over a complete sample analysis. These sizes are measured directly in microns when the stage 8 is scanned at the rate of one millimeter per second and the clock 13 is operated at the rate of one kilocycle per second. As shown in FIG. 10, the signal level being measured is illustrated by the graph that varies through different size levels and the point counters No. 1 through No. 10 in FIG. 1 record the different size levels. In the chart of FIG. 10, only four levels are shown but the circuit of FIG. 1 is capable of counting the sizes of ten different size ranges. The analogue curve of FIG. 10 is drawn for only four size ranges which may be selected for any consecutive four pulse-stretchers but for convenience DMA1 to DMA4 operated respectively by the Schmitt trigger level detectors ST1 to ST4 with the continuous clock pulse curve at the rate of one kilocycle per second. The first level of the analogue curve is read by ST1 but raises above this level before the fifth clock pulse, thus ST1 counts only four in point counter No. 1. The next level also exists through only four clock pulses and thus the point counter No. 2 registers the same from ST2. The level of the curve for ST3 is shorter lasting only for three clock pulses and the same for ST4. However, the curve falls fast and the count drops fast to ST2 for four clock pulses and follows back up to the third level of ST3 for four clock pulses and then drops to the first level where ST1 detects four clock pulses and a very steep rise in the curve selects detector ST4 for three clock pulses. This section of the steep curve does not permit the intermediate detectors to register for every clock pulse. The analogue curve then drops to the second level for five clock pulses and then three clock pulses for the first level where the curve ends. These points are read out in their respective counters at each clock pulse and are recorded on the point counters No. 1 to No. 10.

As shown in FIG. 1, DMA11 to DMA20 digital modules do not feed counters directly, because these counters serve two functions depending on the position of the mode switch. The upper or inverted post output of each of these pulse stretchers is connected to a corresponding digital module NAND–PAC–DL20, indicated as H11 to H20, all of which are collected into the cable H for the purpose of directly energizing corresponding counters P in level 11 to P in level 20 counters. Wherever the mode switch is in position P, readout counters 11 through 20 serve as reflectance level point counters. When the mode switch is in S or D, they serve as size category tally counters as indicated thereon in FIG. 2. This completes the circuit of FIG. 1.

TOTAL POINT COUNT

Referring to FIG. 2, total point count is obtained from the output from the cable J which includes each output pulse from the pulse stretcher DMA1 to DMA20 supplying the same through the cable J to the diode PAC–DC–20 expandable input NAND, the first three impulses being fed to NAND 52; the fourth, fifth and sixth being fed to the NAND 53; and the next three, to the NAND 54; and the next three, to the NAND 55, the next three, to the NAND 56; and the next two, to the NAND 57; and the next two, to the NAND 58; and the last one, to the NAND 59. The purpose of this arrangement of distributing these output pulses throughout the group of NANDS 52 to 59 is merely because one NAND has insufficient inputs to combine all of these into one PAC. However, the summation of the pulses of the NANDS 52 to 59 provides a total count the output of which is obtained from the total point count as indicated.

The output of the NAND 58 which represents the pulses from DMA1 through DMA19 is supplied to the NAND 60, the output of which operates the total counter 2.9%. The total point counter supplies the total count for reflectance levels which were less than 2.9% reflectance. In order to gate the inverter 60, the input line E requires that the proper phase must be present on line E which occurs only when the mode selector switch is in position P for petrographic analysis. This set up means that the total counter for reflectance is less than 2.9% is used only in the petrographic analysis mode of operation.

PYRITE COUNT

Figure 9:
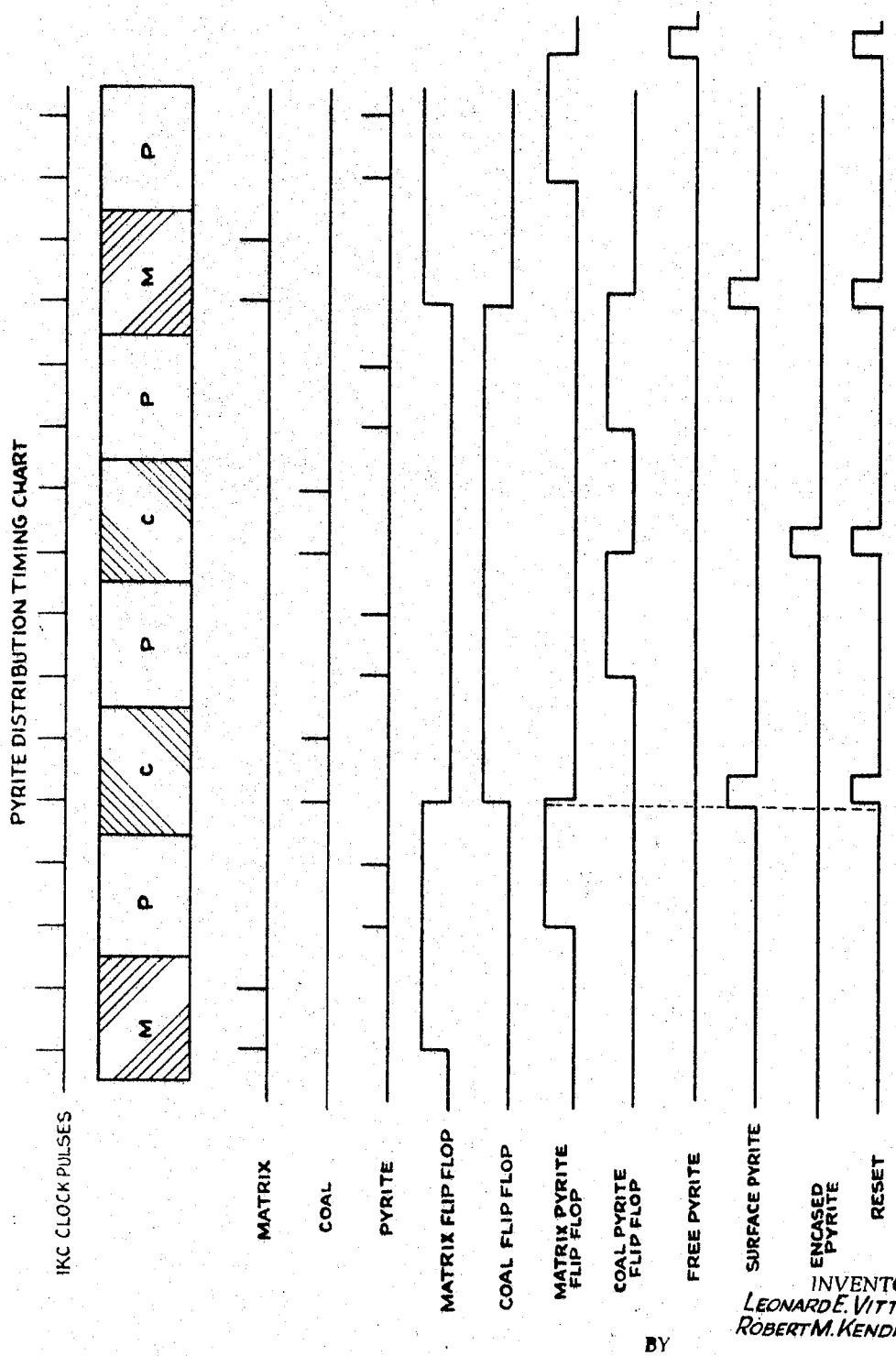
FIG. 9 is a pyrite distribution timing chart.

To obtain the pyrite count the outputs of the sample gates G2, G4 and G3 are also cabled in the cable J of FIG. 1 and are provided to feed a digital module NAND PAC DL20 numbers 61, 62 and 63 respectively, and the basic flip-flop PAC FF20 of FIG. 2. The pyrite distribution chart is shown in FIG. 9. The output of the gate G2 also feeds the setting of the basic flip-flop PAC FF20 indicated at the set of FF64 and the reset of FF65. The output of G3 will set the flip-flop 65 and reset the flip-flop 64.

The pyrite distribution logic circuit is for the purpose of detecting the presence of pyrite distributed through the sample in the following order.

(1) Free pyrite which occurs when a particle of pyrite is completely surrounded by the plastic matrix.

(2) Surface pyrite in which the particle of pyrite is located on the surface of a piece of coal.

(3) Encased pyrite in which the particle of pyrite is completely surrounded by coal.

These distributions may be detected by recording the sequence in which the reflectance levels occur as the sample is passed through the field of the microscope and may be abbreviated or symbolized as follows:

(1) MPM for free pyrite.
(2) MPCM for surface pyrite.
(3) MCPCM for encased pyrite.

The three signals from gates 2, 3 and 4 in FIG. 1 are chosen as the signal levels because they completely define the quantities involved in this analysis; namely, matrix signal from gate G2, coal signal from gate G3 and pyrite signal from gate G4, the output of each are supplied through line J of FIG. 1 to line J of FIG. 2.

For the case of free pyrite the first signal detected is the matrix signal which is designated as signal G2 in line J. This signal sets flip-flop FF64 and resets flip-flop FF65 if it had previously been set. Signal G2 is also connected to the input of NAND 61; but, at present, the logic has not progressed to the point where this is important.

The next signal which occurs in the free pyrite situation is the signal from gate G4. The G4 signal for the pyrite level introduces a signal to an input of inverter 63. This inverter, the output of which is connected to the input of NANDS 66 and 67, and the signal in conjunction with the set output from flip-flop 64, combine to produce a signal to set flip-flop 70. The information now recorded in flip-flop 70 is a memory of the sequence matrix signal followed immediately by pyrite signal.

The next signal which occurs in the instance of free pyrite is the matrix signal G2 which now presents an input to inverter 61, the output of which is presented to NANDS 72 and 74. This signal is combined with the set signal from flip-flop 70 in NAND 72. The other input to NAND 72 is provided by the output of NAND 76, the input of which is connected to cable A which comes directly from the D position of the mode selector switch which is grounded. In this mode the output of NAND 76 is always of such a phase as to permit an output from NANDS 72, 73 and 74 when their other inputs are properly combined. Thus, under the preceding sequence, NAND 72 now gates an output to pulse stretcher DMA77, the output of which registers one tally in the free pyrite counter. The output of pulse stretcher DMA77 also is connected to one input of NAND 80. During the pulse which registers on the free pyrite counter, this NAND 80 gates an output pulse which combines with the proper signal from the master clock 13 through cable F in NAND 68, the output of which resets both flip-flops 70 and 71 so that these circuits are now ready for the next sequence of signals.

The next possible sequence of signals is for the surface pyrite case, in which case the first signal will again be the G2 matrix signal which will set flip-flop 64 and reset flip-flop 65. Again the next signal will be the pyrite signal G4 which will again combine with the matrix flip-flop signal from flip-flop 64 in NAND 66 to set the flip-flop 70.

The next signal in this sequence will be the coal signal G3 which will set flip-flop 65 and reset matrix flip-flop 64. Signal G3 is also presented to the input of inverter 62, the output of which is combined in NAND 73 with the output from flip-flop 70. The other input is again supplied from inverter 76 which is set to the proper phase from the selector switch as described previously. NAND 73 in turn gates the pulse to pulse stretcher DMA78 which in turn produces a pulse to register one tally in the surface pyrite counter. The output of DMA78 is also connected to NAND 80 which at this time gates an output pulse to NAND 68 where it is combined with the proper signal from the master clock 13 through line F. The output of NAND 68 again resets flip-flops 70 and 71 as previously described.

The sequence, in the case of encased pyrite, is first the coal signal G3, then the pyrite G4 followed immediately by the coal signal G3. The occurrence of the coal signal G3 sets flip-flop 65 and resets flip-flop 64 as described previously. The arrival of the pyrite signal G4 is combined with the output of flip-flop 65 in NAND 67, the output of which sets flip-flop 71. The next signal is again the coal signal G3 which is presented to the input of inverter 62, the output of which is combined with the output of the coal pyrite flip-flop 71 in NAND 75. The output of NAND 75 presents a pulse to the input of pulse stretcher DMA79, the output of which causes a tally to be registered in the encased pyrite counter and also causes the output of NAND 80 to again be combined with the clock negation pulse in NAND 68 so as to again reset flip-flops 70 and 71. This completes the logic for the pyrite distribution circuit and is graphically illustrated in FIG. 9 which follows the pulse signals through reset.

PARTICLE SIZE

The problem here is to record pyrite particle size or coke wall size and coke void size in the following size categories expressed in microns.

Below 4, or 0–3 may be the first level, 4 to 7, 8 to 15, 16 to 31, 32 to 63, 64 to 127, 128 to 255, 256 to 511, 512 to 1023, and over 1024 as the tenth level of counters numbered P11 to P20 in FIG. 2.

If the table 8 is moving at one millimeter per second, and the photomultiplier signal is stopped at 1 kc., then each pulse represents one micron.

Figure 8:
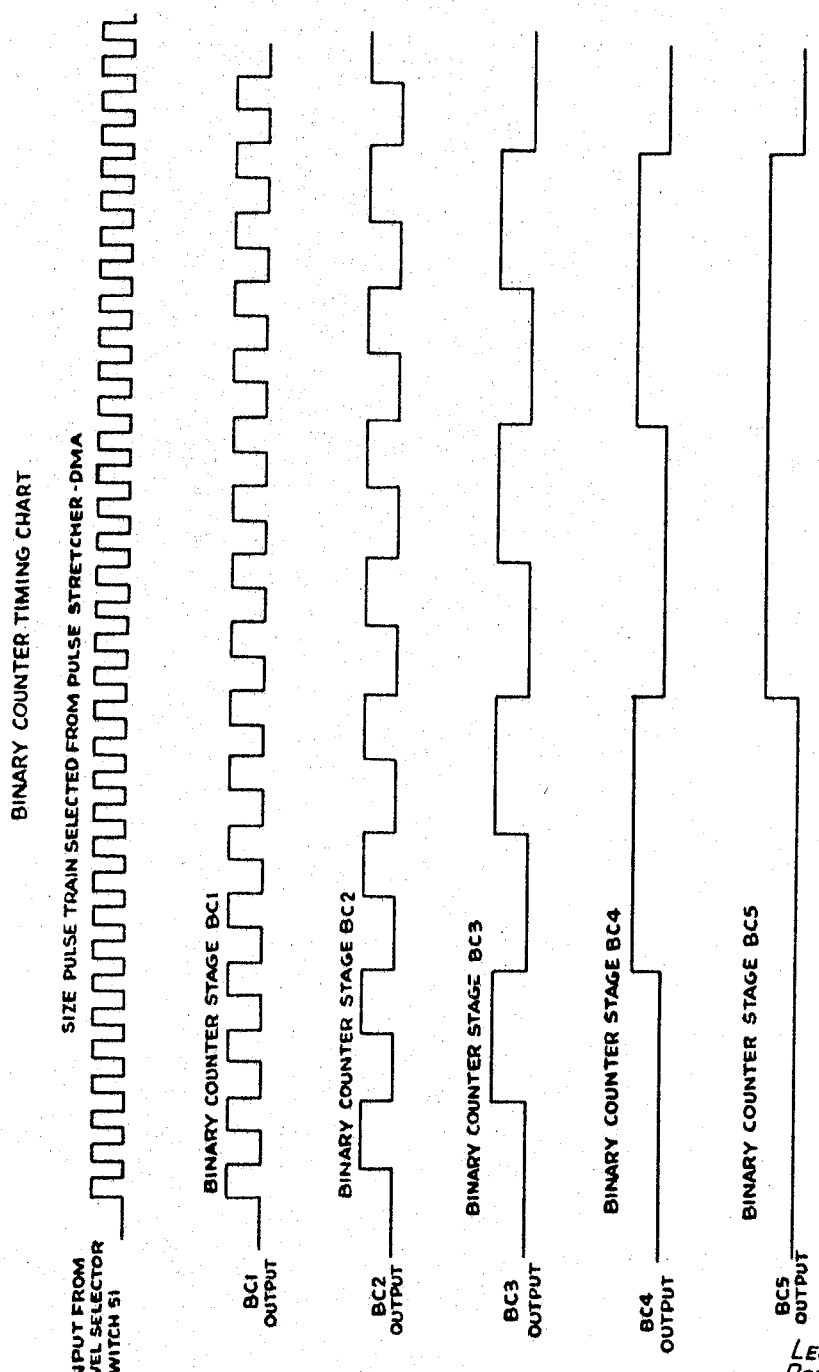
FIG. 8 is a binary counter timing chart.

Reflectance levels may be categorized as to their particle size distribution. This is done for convenience from the signals DMA1 through DMA4, but it could be from the signals of any other pulse structure of the circuit of FIG. 1. As previously described these signals are selectively connected by the switch 51 and the signal from any one of these pulse stretchers is supplied simultaneously to the straight binary counters BC1 through BC12 and inverter 81 shown in FIG. 2. Every time the binary counter advances one stage, a gate circuit is enabled and all the others are blocked. In general the technique involved for categorizing size distribution is to detect a train of pulses from the selected reflectance or voltage level and to count the successive pulses in a binary counter while at the same time recording the progress of the binary counter in a separate set of memory flip-flops, FF20 previously mentioned and numbered FF101 to FF109. Also while the pulse train is being counted, a timing circuit is activated to check the spacing between pulses. The Gate Pulse Generator monitors the input pulses and times the interval between pulses. Everytime the pulses cease for a period longer than a preset time, this circuit generates a Gate or read-out pulse and a tally is entered through the enabled gate to its category counter. At the end of the Gate pulse, the binary counter and the gate-setting flip-flops are reset so they will be ready for the next pulse train from the pulse height discriminator of interest. If the pulses stop for a preset length of time, the timing circuit causes the last memory flip-flop activated by the progress of the binary counter to be gated to a recording tally counter; and during the readout pulse the binary counter is reset to 0. At the end of the readout pulse, the memory flip flops are reset to 0 so that the entire circuit is again ready to categorize and record the next train of pulses which may arrive on a pre-selected level. The operation of the binary counters BC1 through BC12 are described completely on pages 3–1 through 3–3 of "Computer Control Manual," 71–113B, and are graphically illustrated in FIG. 8.

Figure 11:
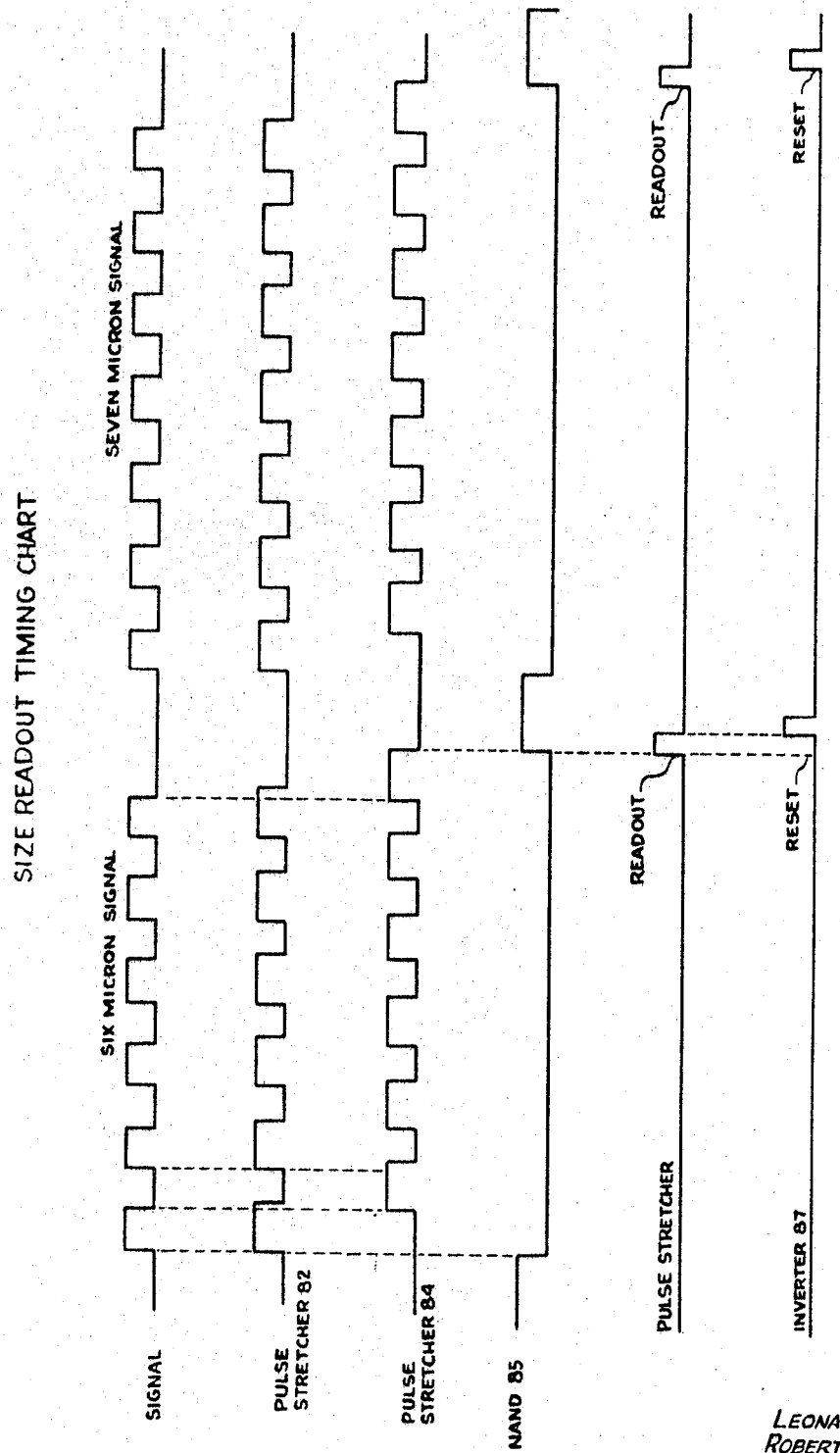
FIG. 11 is a size readout timing chart.

We will consider here the case where the signal selected particle level happens to be first, six and, second, seven microns in length, as shown in FIG. 11, and the stage is being driven at the rate of 1 millimeter per second and the clock frequency is 1000 pulses per second. These conditions will result in a pulse train of six pulses in succession at the clock frequency. A pulse train of this length will drive the binary counter so that the binary counter BC3 is made to change state one time. This will produce a set input to flip-flop FF101. Simultaneously, this pulse train is presented through inverters 81 and 83 to the inputs of pulse stretchers DMA82 and 84 respectively. The purpose of inverters 81 and 83 is to invert the phase of the signals being fed to these pulse stretchers. Consequently, the outputs of pulse stretchers 82 and 84 are 180° out of phase and also are overlapped slightly so that, while the pulse train is present, there is no chance of both inputs of the same phase being presented to a DL2 NAND shown on pages 3–50A to 3–50E/F in the "Computer Control Manual" of reference numeral 85. However, at the end when the pulse train ceases, both DMA82 and DMA84 are permitted to time out to their quiescent state, at which time both inputs of the same phase are presented to NAND 85, the output of which in turn causes pulse stretcher DMA86 to generate a pulse which is connected first to one input of the DL NAND 93 through line 29. The other inputs to NAND 93 are from cables B and D whose level is at the proper phase because of the position of the mode selector switch and the other input to NAND 93 is also at the proper phase unless the stage drive has neared the end of one scanning cycle. Consequently, NAND 93 presents an impulse to inverters 94 and 95 which in turn gate the output sampling NANDS 111 to 117 and 118 through 120 respectively. The first NAND 94 pulses the readout gate 112, the same signal is applied to the binary counter so that BC3 is made to change states one time. This pulses flip-flop 101, being the highest order flip-flop in the set position means that only size counter readout gate 112 has all inputs of the proper phase for a pulse train of six pulses such as previously described. Flip-flop 101 has been set. Flip-flip 102 is still in the reset position wherein the reset output is of the proper phase and is combined with the set output of flip-flop 101 in NAND 112 along with the readout pulse from NAND 95 causing size counter readout gate 112 to provide one count in the four to seven micron category counter No. 12.

The next signal shown in FIG. 11 has seven pulses given to the binary counters BC1 to BC12 and at the same time to the inverters 81 and 83 and thence to the pulse stretchers 82 and 84 and the NAND 85, the output of which is fed to the pulse stretcher DMA86 to set up the NAND 93 to supply inverters 94 and 95.

Here again the pulses are more than three and less than eight. The signal has seven pulses representing a seven micron signal. Consequently, the inverter 94 is again pulsed at the same time that the same signal drives binary counter BC3. This counter produces a set input to flip-flop FF101 and thence to readout gate 112 which has been pulsed to operate this readout gate to add one count to the four to seven micron category counter No. 12.

Any other length of pulse train from the selected level would progress through the counter to a greater or lesser degree in the same manner as that just described.

During the readout pulse time the proper phase of pulse stretcher DMA86 is inverted through inverter 87 and amplified through inverters 89 and 90, the output of which resets all stages of the binary counter by providing a pulse on pin 19 of all binary counter PAC's. This occurs at the end of each signal as shown in FIG. 4. The output of inverter 87 also is presented to the input of pulse stretcher DMA88 the output of which is amplified through inverters 91 and 92 to reset size counter memory flip-flops 105 through 109 and 101 through 104, respectively. Pulse stretcher DAMA88 is triggered on the trailing edge of the pulse from DMA86 thereby providing a delay in the resetting of the memory flip-flops so as to allow the size counter readout gates to be completely strobed before the size counter memory flip-flops are reset. In the case of multiple resets of these logic devices there are cases where we have inverters used in parallel only for the purpose of obtaining ample capacity, such as in the case of inverters 89 and 90, for resetting the binary counter and also in the case of 91 and 92 for resetting the size counter memory flip flops. The logic circuitry used in this system is such that either positive going or negative going logic can be combined in the over-all system to perform the desired operations.

In the event that the stage drive approaches the end of its travel while a particular level is being counted in the binary counter size logic, a circuit has been included to bring about reset of the counter when the stage drive operates limit switch LS3 or LS4 as shown in FIG. 4. The reason for this reset is that a particle under observation as the stage drive reaches its limits will not shown full size. Therefore, any information on such a particle is erased rather than being entered as false information, regarding the actual size of that particle at the end of a scanning motion. This reset is effected by the pickup of relay RLB shown in FIG. 4, contacts of which are shown in FIG. 1 and which transfers to reverse the setting of flip-flop 14 to produce a signal on cable B which is connected on pin fifteen on NAND 93, preventing a signal being produced to readout from the size counter readout gates when the pulse stretchers in the pulse train monitor circuit time out. Resetting of the size counter memory flip flops and the binary counter proceeds as previously described under this condition except for the fact that the size counter readout gates are not activated; the information is thereafter cleared from the binary counter and the size counter memory flip flops by resetting the same.

Again referring to FIG. 4, it is shown that the circuit of the limit switches LS3 and LS4, which energize the relay RLB may be shunted out by the check switch in the check position for the purpose of checking out the operation of the data accumulator, and thereby fixes the position of the RLB contacts RLB1 and RLB2. FIG. 4 also shows the start button which picks up the RLA relay through the stop push button. The normally closed relay of the preset counter 22 maintains the stick or holding circuit of the relay RLA through the normally open RLA1 contact. Operating RLA opens the normally closed RLA2 contact connected to the stage drive as shown in FIG. 3.

Figure 5:
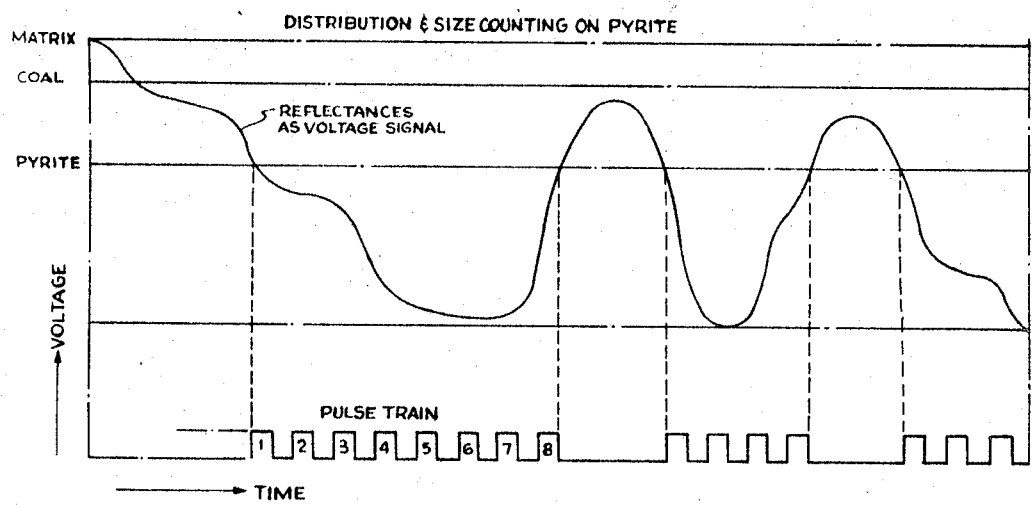
FIG. 5 is a diagrammatic showing of an analog signal in the form of a curve representing the varying voltage signals from the amplifier plotted as a function of time and covering the full scale range of reflectances expected in the sample being analyzed, these process variables are the matrix, the coal, and the pyrite ranges of reflectance values.
Figure 6:
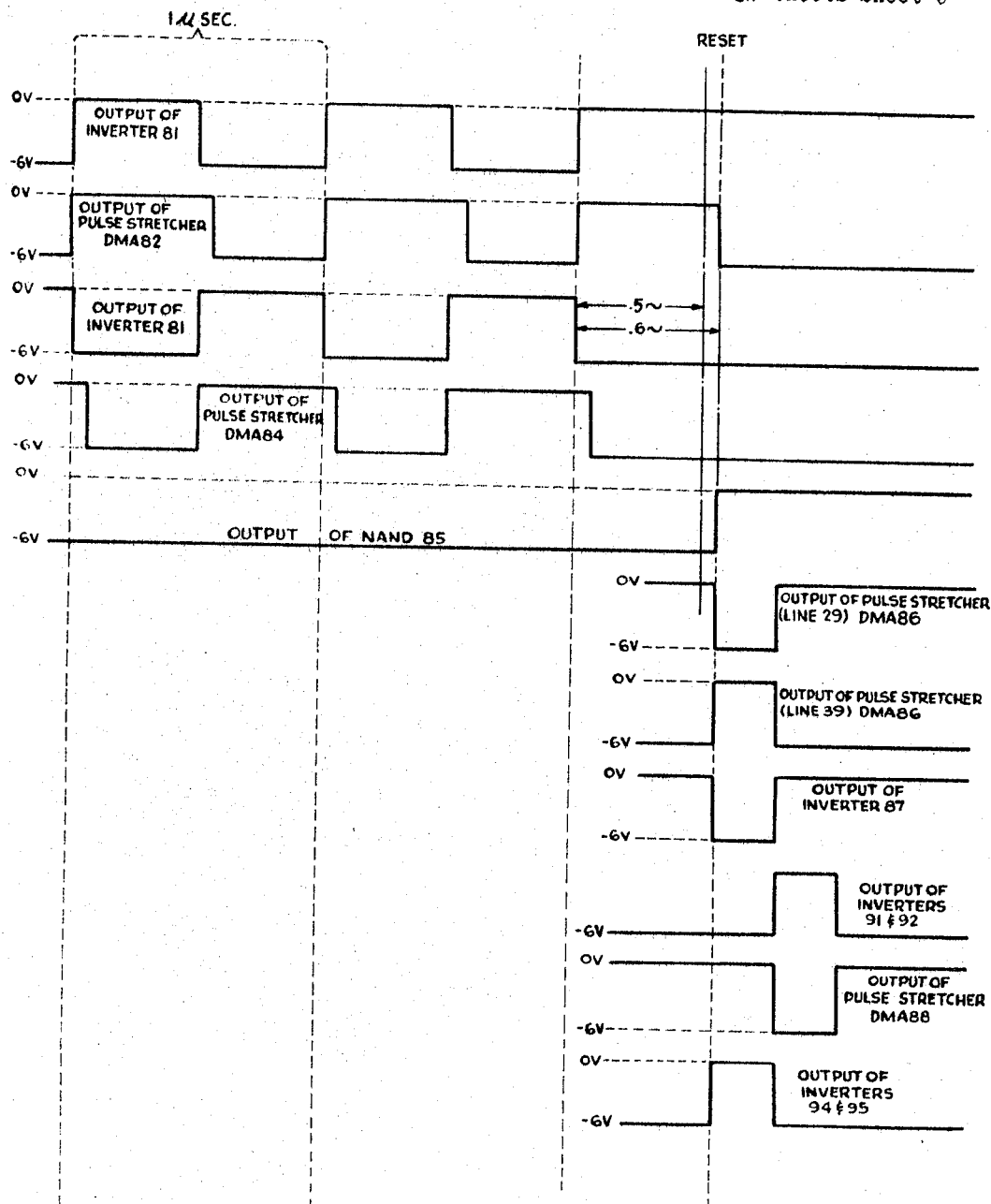
FIG. 6 is a timing chart which illustrates the operation of the pulse train monitoring circuit and the reset circuitry needed to rapidly reset the size counting logic circuitry so that it may be used on a rapid repetitive basis as in the previous diagram of carrying out the count registering of a series of 8 pulses for a selected level of reflectance such as that of the pyrite level.

Referring now to FIGS. 5 and 6, these timing charts illustrate the operation of the size category tally counters. Referring specifically to FIG. 5, this diagram illustrates the type of pulse train referred to in describing the operation of the binary counter and pulse train timing circuit. The first pulse train shown in this figure is the eight pulses which would occur from a particle of pyrite eight microns in length, the levels being illustrated in terms of matrix, coal and pyrite. This process corresponds to the previously described sequential operation of the binary counters and the size counter readout gates.

FIG. 6 is a timing chart illustrating the operation of the pulse stretchers DMA which monitor the length of a continous pulse train such as the eight pulse train shown in FIG. 5.

Figure 7:
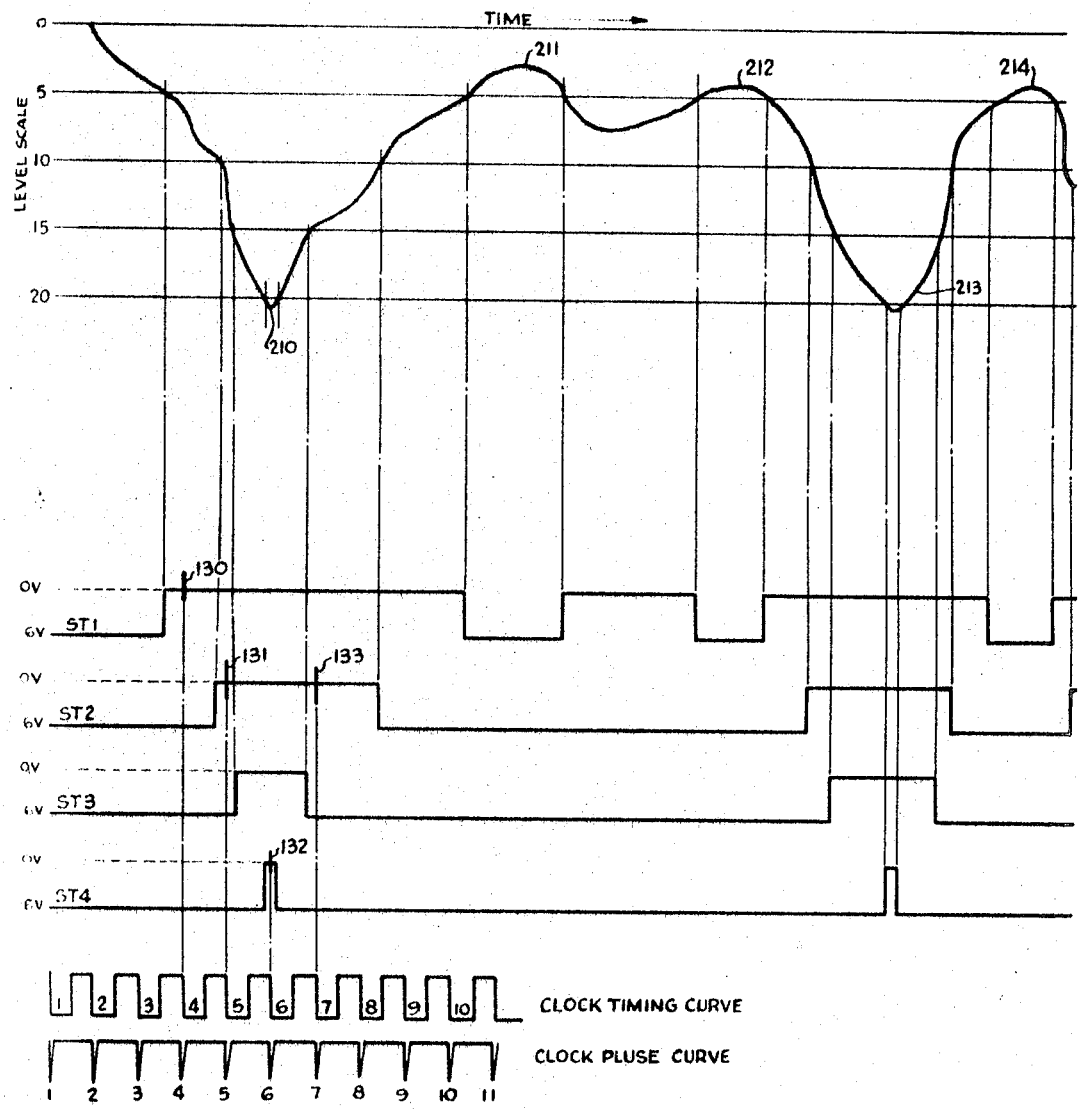
FIG. 7 is a diagrammatic view of an analog signal produced from a specimen which is drawn in conjunction with the digital pulse scales for different levels as keyed by the clock pulses shown.

Referring to FIG. 7, the level detectors illustrated provide five different levels, for convenience each of the levels represent five units and the curve starting from 0 proceeds to the top level which is full scale of 20 as indicated at 210 and then descends to the first level at approximately three as indicated at 211; then passes up to the second level and again descends to the first level as indicated at 212; then passes through the top level at 213 and then down to the first level at 214. This record represents a true analogue voltage reading that is received from the amplifier 24. The clock 13 which functions to properly stobe the readout gates G1 through G4 as previously described is demonstrated by the timing curve. Only the initial portion of each clock pulse is employed to properly stobe the readout gates and the Schmitt triggers ST1 through ST4 and is represented by the clock pulse curve. The initial portion of the clock pulse is from 0 to minus 6 volts and lasts for six tenths of a micro-second.

Where the analog curve first crosses the fifth level the Schmitt trigger ST1 pulses from negative 6 to 0. However, the output of this Schmitt trigger is applied in the form of a digital pulse to the sampling gate G1 through the inverter I1. When the input phase on the three input pins of the sampling gate G1 are the same, this gate will trigger the pulse stretcher DMA1. This occurs at the beginning of the fourth pulse of the clock as indicated by the clock pulse curve and as registered by the vertical mark on the ST1.

As the analog curve passes through the next level as indicated at 10, the Schmitt trigger ST2 becomes energized, however, the pulse 130 is not permitted to readout through the sampling gate G2 until the initial part of the fifth pulse of the time clock, which will provide a readout pulse 131. The analog curve is rather steep and passes through the third level 15 slightly after the readout pulse 131 and this sets the ST3 Schmitt trigger as shown after the clock pulse 5 has started. However, the analog curve passes through the highest level 20 before the next clock pulse which locks any readout from the Schmitt trigger ST3, but permits the setting of the Schmitt trigger ST4 and its readout as indicated at 132.

Coming back down the scale the analog passes through the scale to reset the Schmitt trigger 3 before the same is permitted to readout which is substantially the same condition as that which happened on the way up the curve. Thus, the Schmitt trigger ST2 is set and functions on the seventh pulse of the clock to produce the readout 133 and when the curve further drops through the top of the second level 10 the ST2 pulse again returns to minus 6. The analog curve then proceeds to drop until it passes under the top of the first scale level five which causes the Schmitt trigger to be again reset, as shown, which is after the initial portion of the timing curve. Thus, the clock pulse curve comes too late to permit this signal to be read out by the sampling gate G4.

When the sampling gate G1 reads out the pulse indicated by the reading 130, this sampling gate readout pulse will operate the pulse stretcher DMA1, which in turn will energize the point counter number 1. In like manner, the reading 131 from the gate G2 will energize the pulse stretcher DMA2 which in turn directly pulses the point counter number 2 for one registration.

Since the sampling gate G3 was not permitted to readout, there will be nothing occurring on the point counter number 3, however, the readout 132 by the gate G4 is effective to set the pulse stretcher DMA4 to point counter No. 4. Thus on the way up only three out of a possible four readings were permitted owing to the fact that the curve was steep and insufficient time was permitted by the clock timing curve to permit a reading in the third level as the level fifteen. This, of course, provides a more accurate system in view of the fact that the curve is so steep that it passes through a complete level before registering that the consensus is that there would be no particles at this level.

As a curve descends, the same difficulty occurs because a possible readout is within 1.2 micro-seconds which represents the distance of the readouts 132 and 133. Again, the next reading at the scale level 10 is lost because the curve of level 10 passes from 0 to minus 6 before the end of the eighth timing cycle and the curve passes through the level scale five between the tenth and eleventh pulse of the timing curve. Thus, the particular specimen viewed provides only three readings from a possibility of six which produces a high degree of accuracy in this type of system in view of the fact that no false readings can be given.

If, instead of operating this particular level detection through only the first four point counters with their respective Schmitt triggers, the same was operated with different levels using twenty different Schmitt triggers, each with a point counter, then the level scale would provide far more readings but in some instances such readings would not be as valuable as when there are only a few levels, such as the four levels shown in the chart in FIG. 7.

As previously described, the stage 8 is capable of a scanning movement for the purpose of moving the specimen 4 across the field of the microscope in a straight path and at a constant feed rate driven from the stage drive mechanism by the scanning belt 11. The specimen is then indexed and then moved in the reverse direction in the parallel path to scan the specimen back across the field of the microscope. This continues until the complete surface of the specimen 4 is scanned, observed and the data transmitted to the counters.

When the stage 8 is in its home poistion the limit switches LS1 and LS3 will be closed as shown in FIG. 3. When the power is supplied to the circuit of FIG. 3, current from L1 will pass through the limit switch LS1, normally open contact LS1A will supply current through the relay RL1 returning to line L2, thus energizing this relay. The front contact RL1A, which is normally open will supply current through the normally closed RL4A contact to energize the relay RL3 from line 1 to line 2.

The RL5 relay of FIG. 3 will be energized through the normally open RL1B contact to energize the same across lines L1 and L2. When RL5 relay picks up, it produces a stick or holding circuit through its normally open contact RL5H and normally closed contact RL2A. Direct current dynamic braking voltage is applied to the winding of the scan motor 20 through the contact of relay RL3, which is normally open. The normally closed contact relay shown in RL3A supplies current directly from line voltage from the line L1 to the normally closed RL5A contact and the normally open RL5B and since the relay RL5 in energized the current will flow through the diodes D1 and D2, and through the 150 ohm resistance R1, the RL3A contact and the RL5B contact through the dynamic braking voltage coil 121. The dynamic braking of the index motor 16 is applied when alternating current voltage is applied to both windings 122 and 123 of the index motor 16 and across the condensor C1.

In the starting position, the normally open contact LS6A is held closed by the cam 18 on the traverse control drive and which is in parallel with the RL3D. When the relay RL3D is energized its contact RL3C opens and its contact RL3D closes removing the voltage from one side of the capacitor C1 thereby operating the motor in a clockwise direction. The index motor runs until the pin on the drive disc encounters a dog on the worm wheel to operate LS5. The limit switch LS5 causes its normally open contact LS5A to energize relay RL4. As soon as RL4 is energized its stick, or holding contact, RL4H maintains a circuit through either the back contact LS6B or contact RL1A and the RL4H contact to maintain RL4 energized, thus relay RL4 will maintain energized until both the relay RL1 is de-energized and the relay LS5 is released.

When RL4 relay becomes energized its back contact RL4A opens a circuit of relay RL3. The scan motor 20 will now run having an AC voltage on one side of the condensor C4. The cam slides and stage will move from left to right opening the limit switch LS1 and its contact LS1A opens the circuit of relay RL1.

When relay RL4 is energized its normally closed RL4A contact opens the energizing circuit RL3A and when the cam 21 leaves the limit switch LS1 its contact LS1A opens the circuit of relay RL6 which in turn de-energizes relay RL3 by the opening of contact RL6A. When relay RL3 becomes de-energized its contact RL3D opens and its contact RL3C closes causing the indexing motor 16 to reverse and run clockwise toward its original position until the limit switch LS6 transfers and again supplies a braking voltage to the motor 16 through its contact LS6A.

The scan motor 20 drives from left to right opening limit switch LS1 which opens the contact LS1A to drop out the relay RL1, and the scan motor continues to run until the cam 21 engages the limit switch LS2 and LS4 at the opposite end of the stage travel limits. The LS2 switch when engaged, closes its contact LS2A to pick up relay RL2.

The relay RL2 through its contact RL2B re-energizes relay RL3 through the normally closed RL4A contact. Relay RL2 will open its normally closed contact RL2A to drop out the relay RL5. Relay RL5 upon being de-energized will close its normally closed contact RL5A and open its normally open contact RL5B which reverses the rotation of the scan motor 20 and drives the stage 8 from right to left which is the same direction as previously described and which represents a complete over and back scanning operation. This scanning operation will continue until it is stopped.

Stopping any place in the cycle is accomplished by closing the stop switch 125 which energizes relay RL6, which when energized its contact RL6A in turn applies dynamic braking to the scan motor by opening contact RL3B and closing RL3A to apply dynamic braking to the scan motor. The RL6 relay contact RL6B is also closed to apply a braking voltage to the index motor 16.

Home switch 126 is in parallel with the normally closed contact RLA2 of the relay RLA for the purpose of homing the unit from the remote control contact. Upon the closing of the switch 126 the relay RL6 becomes energized, the next time that the relay RL1 is energized as the switch 126 places these two relays in parallel with each other.

Limit switches LS3 and LS4 are mounted on the scan limit switch assembly above the limit switches LS1 and LS2 as shown in FIG. 3. The limit switch contacts LS3 and LS4 which are also shown in FIG. 4 in the circuit of the RLB relay, and a stop switch 127 is connected in series therewith. This stop switch is normally maintained closed. Opening of these contacts just prior to the operation of the limit switch LS1 and LS2 will drop out the control relay RLB and prevent the counts from being registered while the drive is in the indexing part of the cycle.

Figure 14:
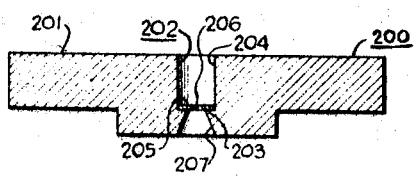
FIG. 14 is a view in cross section of an orifice in a plate the predetermined opening of which limits the field at the focal point of the microscope.

As noted previously, the distance across a crystal or any object to be measured is in microns. The effective field of view through the microscope 1 may be varied in order to examine more closely a crystal under examination or analysis made of an area smaller than normally desired, such as an effective field of view less than one micron. Thus, if desired, by limiting the effective field of view in the microscope 1, a more detailed quantitative as well as qualitative analysis of the specimen may be made. This is accomplished by placing a restricting diaphragm at the focus point of the microscope where the image is formed. As shown in FIG. 14 the restricting diaphragm 200 consists of a disc holder 201 made of any suitable material such as brass, having a centrally located opening 202. The shoulders 203 in the cylindrical portion 204 of the opening 202 support the platinum diaphragm 205 which has a very small opening represented by the line 206, which opening may be as small as twenty microns or less. These openings are very accurately cut holes and are centrally located in the platinum diaphragm. The holes are cut by laser and come commercially in various sizes. The disc holder 201 permits interchangeability of platinum diaphragm 205 depending upon the desired effective field of view. The conical shaped portion 207 of the opening 202 faces toward the specimen being examined in the ocular arrangement of the microscope 1 and permits unrestricted rays of light to be properly directed to opening 206.

As an example of varying the effective field of view the microscope 1, assume a microscope having a 60× objective and an 8× eyepiece (total magnification 250); with an opening 206 of 200 microns in the platinum diaphragm 205, the effective field of view will be 4.4 microns; with an opening of 150 microns, the effective field of view will be 3.3 microns; with an opening of 100 microns, the effective field of view will be 2.2 microns; with an opening of 50 microns, the effective field of view will be 1.1 microns; and with an opening of only 20 microns, the effective field of view will be 0.4 microns. Of course, as the total magnification increases the effective field of view becomes less in area. This is especially true where the opening 206 is of a larger size of opening available. Thus the microscopic ocular may be varied in order to change and limit the affected field of view permitting absolute measurements by close micrometering.

We claim:
1. A microscopic electronic data accumulator comprising a microscope having a lighted field and a specimen supporting stage movable to carry specimens across said lighted field, a photomultiplier light sensitive cell mounted in said microscope to receive the light image passing from the specimen, the changing intensity of the light image being indicative of the characteristics of the specimen to produce a varying current level signal from said changing intensity of the light image from the specimen, an amplifier connected to change said varying current level signal into a comparative voltage level signal of computer circuit operating magnitude, a point counting voltage level detection logic circuit including a bank of binary level detector units each connected to receive said varying voltage level signal, a progressive biasing voltage connected to each successive binary unit to classify said unit for operation at a predetermined voltage level, a NAND inverter unit for each binary unit, a multivibrator having a pulse rate of predetermined frequency, a gate pulse unit connected to each NAND inverter unit, each gate pulse unit pulsed by said multivibrator, each binary output connected to the next lower level gate pulse unit as an inhibitor level of the latter, a pulse stretcher unit for each gate pulse unit and connected thereto, and an electrical pulse counter unit for each pulse stretcher unit for recording the pulses for each level.

2. A point recorder of voltage level detection comprising a varying voltage level signal from which a recording of the pulses for each level are to be made, a bank of binary level detector units each connected to receive said varying voltage level signal, a progressive biasing voltage means connected to each successive binary unit to classify each unit for operation at a predetermined progressive voltage level, a multivibrator of constant pulse rate of predetermined frequency, a gate pulse unit of proper phase connected to the output of each binary unit and all connected to be pulsed by said multivibrator, another output phase of each binary unit connected to the next lower level gate pulse unit as an inhibitor level of the latter, a pulse stretcher unit driven by each gate pulse unit, and an electrical pulse counter unit driven by each pulse stretcher unit for recording the pulses for each level.

3. A micron size category counter comprising a microscope having a lighted field and a specimen supporting stage movable to carry specimens across said lighter field, means to move said stage at a predetermined rate across said lighted field, a photomultiplier light sensitive cell mounted in said microscope to receive the light image from said moving specimen, the changing intensity of the light image being indicative of the characteristics of the specimen, said light sensitive cell having means to produce a varying current level signal from said changing intensity of light from the specimen, an amplifier connected to said cell to change said varying current level signal into a comparative voltage level signal of computer circuit operative magnitude, pulse height discriminator means, a multivibrator pulse rate clock to chop the discriminated signal at a predetermined clock frequency, said pulse height discriminator means including binary level detector means and a gate circuit means connected to receive said voltage level signal from said level detector and to enable the passage of various height signals from said gate circuit means, when pulsed by said pulse rate clock and counter means connected to record the signals from said pulse height discriminators and determine the micron size of the given height discriminators.

4. A micron size category counter comprising a microscope having a lighter field and a specimen supporting stage movable to carry specimens across said lighted field, means to move said stage at a predetermined rate of one millimeter per second across said field, a photomultiplier light sensitive cell mounted in said microscope to receive the light image from said moving specimen, the changing intensity of the light being indicative of the characteristics of the specimen, said light sensitive cell having means to produce a varying current level signal from said changing intensity of light from the specimen, an amplifier connected to said cell to change said varying current level signal into a comparative voltage level signal of computer circuit operative magnitude, pulse height discriminator means, a multivibrator pulse rate clock to chop the discriminated signal at one kilocycle clock frequency, said pulse height discriminator means including binary counter means and a gate circuit means connected to receive said voltage level signal and to enable the passage of various height signals from said pulsed gate circuit means, and counter means connected to record the signals from said pulse height discriminators and determine the count and size of the given height discriminators in the measurement of microns.

5. A microscopic electronic data accumulator comprising a microscope having a lighted field and a specimen supporting stage movable to carry a specimen across said lighted field to scan the specimen, a photo multiplier light sensitive cell mounted in said microscope to receive the light image passing from the specimen to produce a varying current level signal from the changing intensity of said light image being indicative of the characteristics of the specimen, an amplifier connected to change said varying current level signal into a comparative voltage level signal of computer circuit operating magnitude, a bank of binary level detector units each connected to receive said varying voltage level signal, a progressive biasing voltage connected to each successive binary unit to classify each unit for operation at a predetermined voltage level, a multi-vibrator of constant pulse rate, a gate pulse unit of proper phase connected to the output of each binary unit and all connected to be pulsated by said multi-vibrator, another output phase of each binary unit connected to the next lower level gate pulse unit as an inhibitor level of the latter, a pulse stretcher unit driven by each gate pulse unit, an electrical impulse counter unit driven by each pulse stretcher unit for recording the pulses for each level to provide a point count for each level together with the total point count, mode swich means to operate selected pulse stretchers to determine in a first position the distribution of pyrite in coal and simultaneously size count one level and in a second position the percentage relationship between a plurality of levels in a scanned specimen and simultaneous size distribution analysis of any different level of the same.

6. A pyrite distribution logic circuit for measuring free pyrite surrounded by matrix, surface pyrite located on the surface of a piece of coal and encased pyrite completely surrounded by coal which consists in a microscopic scanning light image indicative of each of the three materials of matrix and pyrite and coal, a photo multiplier light sensitive cell means mounted to receive said scanning light image and convert the same into a varying electric level signal, a progressively level biased bank of binary level detector units each connected to receive said varying electric level signal, one for the matrix signals, one for coal signals, and one for pyrite signals, a multi-vibrator of constant pulse rate of predetermined frequency, a gate pulse unit of proper phase connected to the output of each binary unit and all gates connected to be pulsated by said multi-vibrator, another output phase of each binary unit connected to the next lower level gate pulse unit as an inhibitor level of the latter, a matrix set and a coal reset flip flop and a first NAND connected to said matrix gate, a coal set and a matrix reset flip flop and a second NAND connected to said matrix gate, and a third NAND connected to said pyrite gate, and counter readout means to numerically set out each of the three conditions in analyzing the coal.

7. A pyrite distribution logic circuit for measuring free pyrite surrounded by matrix, surface pyrite located on the surface of a piece of coal and encased pyrite completely surrounded by coal which consists in a microscopic scanning light image indicative of each of the three materials of matrix and pyrite and coal, a photo multiplier light sensitive cell means mounted to receive said scanning light image and convert the same into a verying electric level signal, a progressively level biased bank of binary level detector units each connected to receive said varying electric level signal, one for the matrix signals, one for coal signals, and one for pyrite signals, a multi-vibrator of constant pulse rate of predetermined frequency, a gate pulse unit of proper phase connected to the output of each binary unit and all gates connected to be pulsated by said multi-vibrator, another output phase of each binary unit connected to the next lower level gate pulse unit as an inhibitor level of the latter, a selector stage of two flip flops and three NANDS, said matrix gate connected to set the first flip flop and reset the second flip flop and pulsate the first NAND of said selector stage, said coal gate connected to reset the first flip flop and set the second flip flop and pulsate the second NAND of said selector stage, said pyrite gate connected to pulsate said third NAND of said selector stage, a connected output NAND for each flip flop, the output of said third NAND connected to pulsate each of said output NANDS, a pair of memory flip flops each connected with the output of respective output NANDS, a bank of two pairs of clock pulsated gate readout NANDS, one in each pair of which is connected to the output of each memory flip flop, a bank of three pulse flip flops one pulsed by two of said gate NANDS and the other two gate NANDS pulsating each of said other pulse stretchers, a counter for each of said three pulse stretchers, the other of each pair of gate readout NANDS connected to the outputs of said first and second NANDS of said selector stage, and a reset NAND means having its input connected to said bank of pulse stretcher flip flops and its output connected to reset said memory flip flop.

8. A counter to determine the number and size distribution of minute particles in a specimen comprising a microscope having a lighted field, a specimen supporting stage means mounted for alternate scanning and indexing movement across the lighted field to produce a light beam of changing intensity indicative of the characteristics of the particles, means to convert the light beam of changing intensity into a varying electrical level signal, a progressively level biased series of binary level detector units each connected to receive said varying electric level signal, a multi-vibrator of constant pulse rate of predetermined frequency, a gate pulse unit of proper phase connected to the ouput of each binary unit, each gate pulse unit connected to be pulsated by said multi-vibrator, another output phase of each binary unit connected to the next lower level gate pulse unit as an inhibitor level of the latter, a pulse stretcher connected to be driven by each corresponding gate pulse unit, point counter to tally the number of particles for each level, a level selector switch to selectively connect each point counter to each pulse stretcher, a connected series of categorizing size distribution binary counters fed by said level selector switch to supply a train of pulses from a selected level and counting its successive pulses in said binary counters, a plurality of size counter memory flip flops energized by selected of said binary counters for receiving the pulse trains therefrom, a gate sampling NAND and a level size counter for each flip-flop, said level selector switch to supply the pulse train thereto which at the end of a train of pulses reads out the respective gate sampling NAND to register on the respective level size counter.

References Cited

UNITED STATES PATENTS

| | | |
|---|---|---|
| 2,656,757 | 10/1953 | Stern. |
| 2,661,902 | 12/1953 | Wolff. |
| 2,731,202 | 1/1956 | Pike. |
| 3,214,574 | 10/1965 | Landsman. |
| 3,345,502 | 10/1967 | Berg. |
| 3,349,227 | 10/1967 | Martens. |

FOREIGN PATENTS 980,602   1/1965   Great Britain.

MAYNARD R. WILBUR, Primary Examiner

GREGORY J. MAIER, Assistant Examiner

U.S. Cl. X.R.

356—102